US012591787B1

(12) United States Patent
Jenkins et al.

(10) Patent No.: US 12,591,787 B1
(45) Date of Patent: Mar. 31, 2026

(54) FORECASTING EVENTS BY MODELING TIME SERIES DATA

(71) Applicant: UIPCO, LLC, San Antonio, TX (US)

(72) Inventors: Austin Jenkins, Phoenix, AZ (US); Matthew Christopher Kaplan, San Antonio, TX (US); Conor Wroble, Surprise, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 950 days.

(21) Appl. No.: 17/668,631

(22) Filed: Feb. 10, 2022

(51) Int. Cl.
        *G06N 5/02*                    (2023.01)
(52) U.S. Cl.
        CPC ...................................... *G06N 5/02* (2013.01)
(58) Field of Classification Search
        CPC ....... G06N 20/00; G06F 30/20; G06F 18/214; G06F 17/18
        See application file for complete search history.

(56) References Cited

U.S. PATENT DOCUMENTS

| | | | |
|---|---|---|---|
| 10,331,495 B2 * | 6/2019 | Bequet .................. | G06F 9/5083 |
| 10,832,574 B1 | 11/2020 | Agarwal et al. | |
| 11,928,964 B1 | 3/2024 | Dama et al. | |
| 2007/0055477 A1 * | 3/2007 | Chickering ............ | G06Q 30/02 |
| | | | 702/182 |
| 2008/0255887 A1 | 10/2008 | Gruter | |
| 2013/0083063 A1 | 4/2013 | Geisner et al. | |
| 2013/0198737 A1 | 8/2013 | Ricci | |

| | | | |
|---|---|---|---|
| 2014/0214319 A1 | 7/2014 | Vucetic et al. | |
| 2015/0302667 A1 | 10/2015 | Punjabi et al. | |
| 2015/0371541 A1 | 12/2015 | Korman | |
| 2017/0228899 A1 | 8/2017 | Witriol et al. | |
| 2018/0054721 A1 | 2/2018 | Choe et al. | |
| 2018/0313661 A1 | 11/2018 | Eyster et al. | |
| 2018/0349792 A1 | 12/2018 | Zhao et al. | |
| 2019/0102798 A1 | 4/2019 | Jain et al. | |
| 2020/0090516 A1 | 3/2020 | Sert et al. | |
| 2020/0152061 A1 | 5/2020 | Adelsberger et al. | |
| 2020/0211390 A1 | 7/2020 | Gerber | |
| 2020/0311615 A1 * | 10/2020 | Jammalamadaka ... | G06N 20/20 |

(Continued)

OTHER PUBLICATIONS

Kouwenberg ( Roy Kouwenberg, Agnieszka Markiewicz, Ralph Verhoeks and Remco C. J.Zwinkels, Model Uncertainty and Exchange Rate Forecasting, The Journal of Financial and Quantitative Analysis, Feb. 2017, vol. 52, No. 1(Feb. 2017), pp. 341-363) (Year: 2017).*

*Primary Examiner* — Schyler S Sanks
(74) *Attorney, Agent, or Firm* — Dannon G. Allbee; Potomac Law Group, PLLC

(57)                          ABSTRACT

An event forecasting system can filer time series data by identifying outliers and/or data instances that align with an exception, and either remove or replace them. The event forecasting system can further select a set of models expected to be best predictive for the time series data by performing an initial ranking using a first part of the time series data, validated by a second part; and performing a second ranking of the best models using the first part and second parts of the time series data, validated by a third part. Finally, the event forecasting system can output results to a user interface where a user can view the known and predicted data values and make injects to manually adjust the predicted values as desired.

20 Claims, 7 Drawing Sheets

(56) References Cited

U.S. PATENT DOCUMENTS

| | | |
|---|---|---|
| 2020/0311848 A1 | 10/2020 | Weldemariam et al. |
| 2021/0150418 A1 | 5/2021 | Amrouss et al. |
| 2021/0193302 A1 | 6/2021 | Day et al. |
| 2021/0201274 A1 | 7/2021 | O'Brien et al. |
| 2021/0256768 A1 | 8/2021 | Zhao et al. |
| 2021/0258722 A1 | 8/2021 | Miller |
| 2022/0019634 A1 | 1/2022 | Allison et al. |
| 2022/0076282 A1 | 3/2022 | Monassebian et al. |
| 2022/0092979 A1 | 3/2022 | Gambella et al. |
| 2022/0164895 A1 | 5/2022 | Beckwith et al. |
| 2022/0198438 A1 | 6/2022 | Fiesinger |
| 2023/0072718 A1 | 3/2023 | Bond et al. |
| 2023/0123916 A1 | 4/2023 | Wyatt et al. |
| 2023/0137256 A1 | 5/2023 | Chien et al. |
| 2023/0267551 A1 | 8/2023 | Breitweiser et al. |
| 2023/0273822 A1 | 8/2023 | Ortiz et al. |
| 2023/0281722 A1 | 9/2023 | Westhues et al. |
| 2023/0316417 A1 | 10/2023 | Leise |
| 2023/0334438 A1 | 10/2023 | Horstmann |

* cited by examiner

100
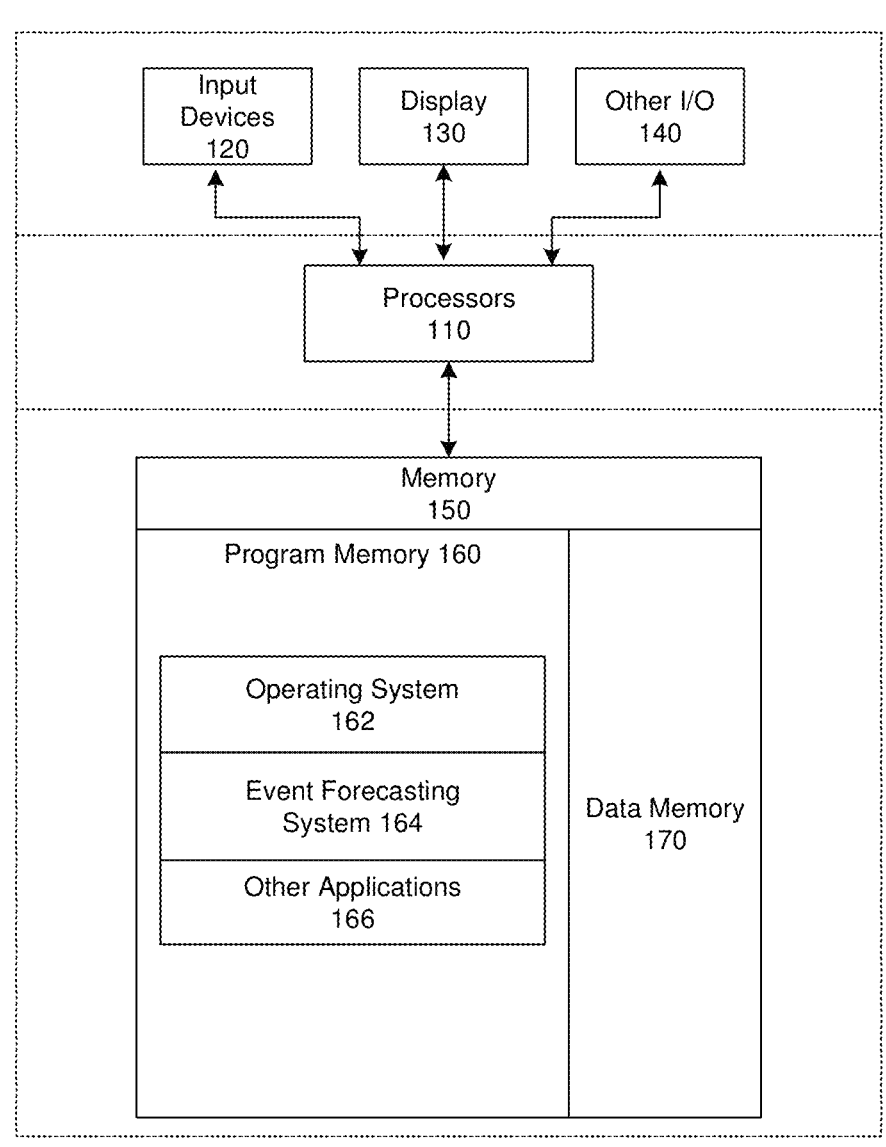
| Input Devices 120 | Display 130 | Other I/O 140 |
Processors 110
Memory 150
Program Memory 160
Operating System 162
Event Forecasting System 164
Other Applications 166
Data Memory 170
*FIG. 1*

300

302 processing units 304 working memory 306

I/O 310 storage memory 308

320

BIOS 326

OS 322 local programs 324

340 interfaces 342 data validation module 344 model selection module 346 prediction module 348 user interface module 350

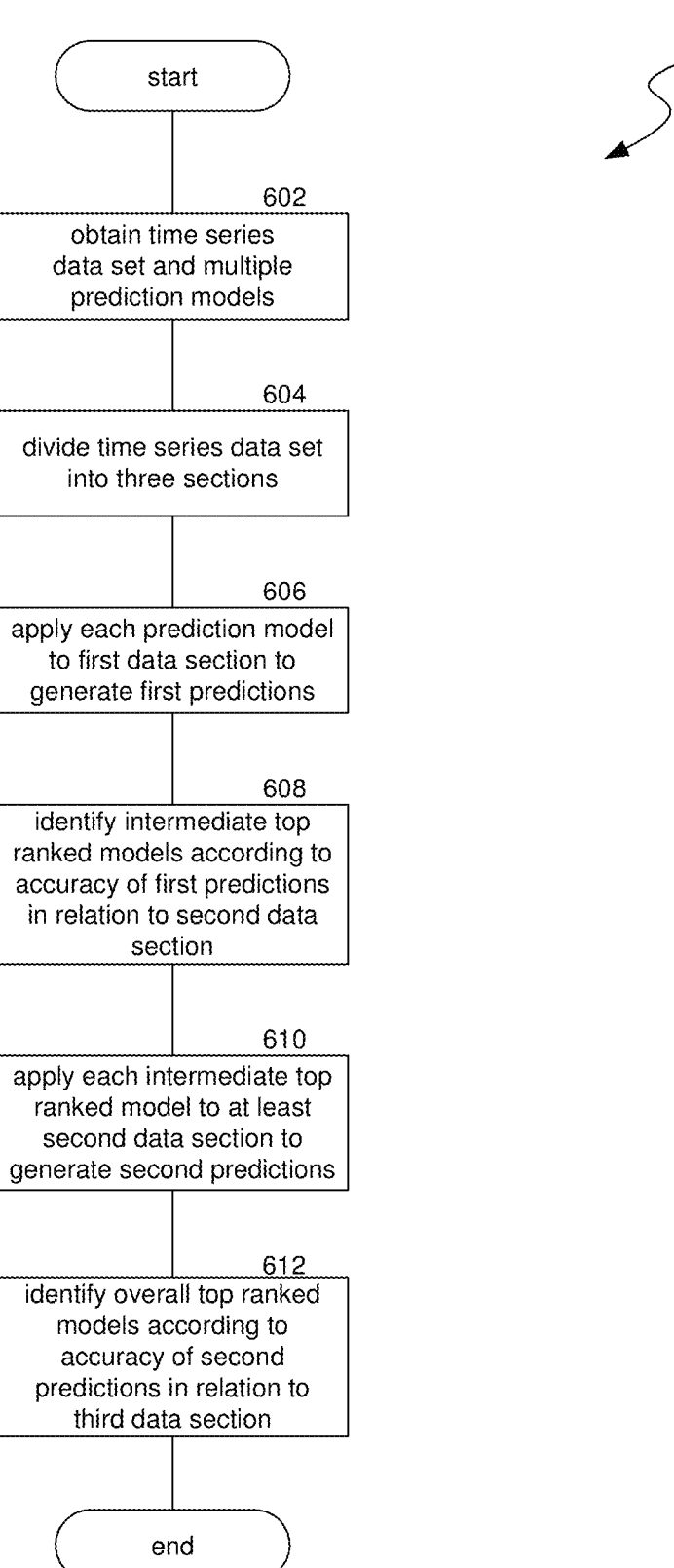

600 start 602
obtain time series data set and multiple prediction models 604
divide time series data set into three sections 606
apply each prediction model to first data section to generate first predictions 608
identify intermediate top ranked models according to accuracy of first predictions in relation to second data section 610
apply each intermediate top ranked model to at least second data section to generate second predictions 612
identify overall top ranked models according to accuracy of second predictions in relation to third data section end

*FIG. 6*

*FIG. 7*

FORECASTING EVENTS BY MODELING TIME SERIES DATA

TECHNICAL FIELD

The present disclosure is directed to improved forecasting of events, such as call center volume, by modeling time series data with data validation, automatic model selection through performance evaluations, and result visualization techniques.

BACKGROUND

Forecasting from time series data is a cornerstone of a vast array of activities. Applications in a variety of fields such as engineering, workforce planning, production schedules, and biological cycles, just to name a few, can be mapped and forecasted with time series data. However, the accuracy of such predictive efforts can be severely impacted by an amount of aberrant instances in the data and by the selection of which model(s), of the many available time series models, to apply. Further, how such predictions output from selected models and with which user interface controls can determine whether the data is correctly interpreted and whether the overall system provides resource optimizations.

BRIEF DESCRIPTION OF THE DRAWINGS

FIG. 1 is a block diagram illustrating an overview of devices on which some implementations can operate.

FIG. 6 is a flow diagram illustrating a process used in some implementations for selecting one or more top performing time series models.

FIG. 7 is a conceptual diagram illustrating an example of a user interface (UI) providing existing and predicted time series data and an interface for modifying the predicted time series data.

The techniques introduced here may be better understood by referring to the following Detailed Description in conjunction with the accompanying drawings, in which like reference numerals indicate identical or functionally similar elements.

DETAILED DESCRIPTION

Figure 2:
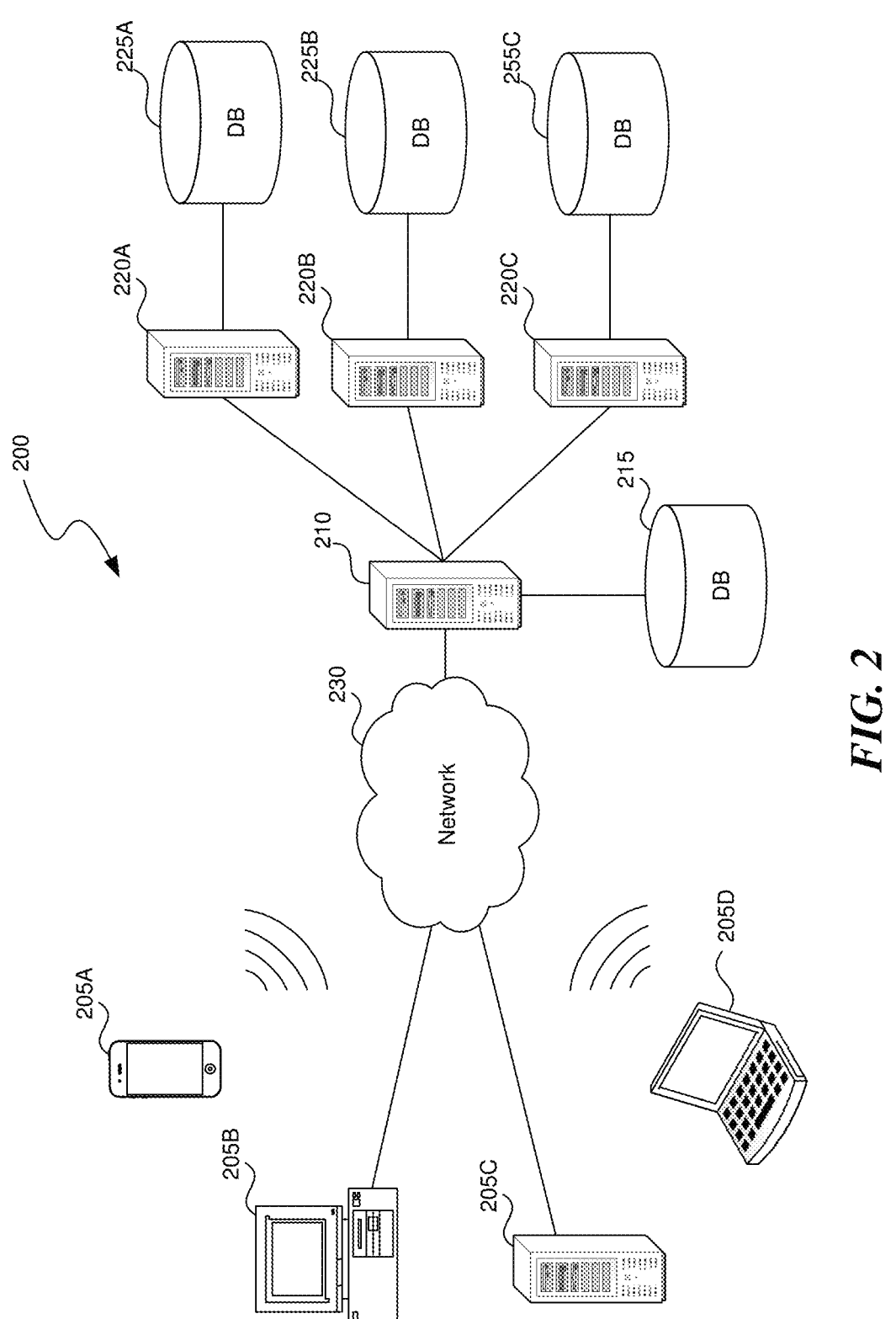
FIG. 2 is a block diagram illustrating an overview of an environment in which some implementations can operate.

Aspects of the present disclosure are directed to an event forecasting system that can: filter time series data to eliminate aberrant instances, dynamically select and update sets of predictive models for the time series data, and effectively present the time series data and predictions with controls to facilitate manual adjustments. The event forecasting system can apply a directed acyclic graph to account for dependencies between simulations. For each simulation, the event forecasting system can filer the data by identifying outliers and/or data instances that align with an exception, and either remove or replace them. The event forecasting system can further, for each simulation, select one or more models best predictive for the time series data in that simulation by performing an initial ranking using a first part of the time series data, validated by a second part; and performing a second ranking of the best models using the first part and second parts of the time series data, validated by a third part. Finally, the event forecasting system can output results to a user interface (UI) where a user can view the known and predicted data values and make injects to manually adjust the predicted values as desired.

In some implementations, the time series data can be cascading such that later simulations using the data can be dependent on earlier ones. In these cases, the event forecasting system can take a user-defined directed acyclic graph (DAG), where each node defines a simulation, and there are incoming edges to each node from the simulations on which that node depends. The event forecasting system can step through each node, going to a node when all incoming edges for that node are complete. In other implementations, simulations can be defined independently, and the event forecasting system can perform the below processes without regard to results of previous simulations.

For each simulation (e.g., at each DAG node or for individual simulations), the event forecasting system can execute a data acquisition query to obtain a corresponding data set. For example, the simulation can define a data source, or the simulations can pull from a default data source. In various cases, the simulation can define a time range for items to pull from the data source or can pull all time series data items. In some cases, the simulation can define a query (e.g., a SQL query) to specify what data source and/or what data items to pull. In some cases, the event forecasting system can store data items from previous executions of the simulation and can only augment them with updates made since that previous simulation. Once the data items have been obtained, the event forecasting system can analyze the data items in a variety of ways to filter aberrations. In various implementations, the event forecasting system can perform filtering by one or more of: identifying outliers that are outside a standard deviation of the entire set of time series data items, identifying outliers that are outside a standard deviation of data items corresponding to previous corresponding measures for that time slot (e.g., the set of measures from the same month, from the same date in past years, etc.), and/or can identify data items that have been associated with an external irregular factor (e.g., falling on a holiday, happening during a disaster, resulting from uncommon political instability, etc.) In various cases, the event forecasting system can remove such identified data items or can replace them with an average (or time weighted average) of corresponding previous measures for that time slot.

Once sound time series data is acquired, the event forecasting system can analyze it to determine which set of one or more models is expected to be a best predictor for that time series. In various implementations, this selection of one or more models can be performed each time a simulation is performed, only the first time the simulation is performed, periodically (e.g., every tenth time the simulation is performed), or in response to a trigger event (e.g., every time a threshold amount of new data items are gathered since the model selection was performed). The event forecasting system can select from time series analysis models such as: Autoregression (AR); Moving Average (MA); Autoregressive Moving Average (ARMA); Autoregressive Integrated Moving Average (ARIMA); Seasonal Autoregressive Integrated Moving-Average (SARIMA); Seasonal Autoregressive Integrated Moving-Average with Exogenous Regressors (SARIMAX); Vector Autoregression (VAR); Vector Autoregression Moving-Average (VARMA); Vector Autoregression Moving-Average with Exogenous Regressors (VARMAX); Simple Exponential Smoothing (SES); or Holt Winter's Exponential Smoothing (HWES). To select the model(s) to use, the event forecasting system can first split the time series data into three sections. The event forecasting system can use each of the potential models using the first time series section as input, with the prediction results from that model compared to the second section to determine a first accuracy score for each model. The intermediate top scoring models (e.g., those with a rank above a threshold, the top threshold number, etc.) can then use both the first and second time series sections as input, with the prediction results compared to the third section to determine a second accuracy score for each of the intermediate top scoring models. The event forecasting system can then select one or more of the intermediate top scoring models with the highest second accuracy score (e.g., the highest scoring one or more, those with a second accuracy score above a threshold, etc.) as the overall top scoring models to be used in the simulation on the full dataset to generate prediction results.

The event forecasting system can provide prediction results (and in some cases the source time series data) in a user interface (UI). In various implementations, the UI can illustrate the prediction results (and time series data) as graphs. For example, a graph of the time series data can be shown in a first color and a graph of the prediction results can be provided in a second color. In some cases, the graph of the prediction results can be divided into two colors-one representing data in an imminent time horizon that may have been acted upon and thus cannot be changed and one representing data in a later time horizon that can be changed. In some implementation, the user can access individual predicted data items (e.g., in a table in the UI) and adjust them, which is referred to herein as making an inject. The event forecasting system can save the injects to a data source for future time-series modeling. The event forecasting system can also further divide the graph of the prediction results such that the graph of the values predicted by the model are in a first color and the graph of the values as modified by injects are in another color. The event forecasting system can provide the predicted values (as modified by injects, if any) as output, e.g., to a workforce management system to create work schedules.

In an example, the event forecasting system can forecast call center volume for call center staffing. The event forecasting system can gather time series data, for simulation, comprising historical call center volume data points for a time period such as the past five years. For each data point, the event forecasting system can determine whether that data point is within a standard deviation for the data points in the corresponding week over the five year period and, if not, filter out that data point. The event forecasting system can then divide the time series data into three sections, one for initial predictions by a set of models, a second to rank the set of models according to the accuracy of the initial predictions, and then to perform a second round of predictions with the top ranked models on the first and second data sections and using the third set as a comparison factor for judging model predictive accuracy. The event forecasting system can use the best scoring model(s) on the full set of time series data to generate predictions of call future call center volume. The prediction results are output to a UI where a user can view the known and predicted data values and make injects to adjust the predicted values as desired. The adjusted predicted values are provided as output, e.g., to a workforce management system to create work schedules for the call center. While this example is illustrative, the event forecasting system can be applied to many other types of time series data systems to improve predictive modeling.

There are existing modeling systems that can take time series data and predict future data points. However, these systems suffer from a number of deficiencies. For example, these existing system often rely on time series data where some of the data points are aberrations, reducing the accuracy of the models and requiring user intervention to filter data. Further, these existing systems either use a default predictive model or require manual model selection and, by failing to use the model best suited to the data set, these systems further have poor performance and require manual selection and tuning. Finally, these existing systems tend to present the data set and predictions in manners that are unintuitive to interpret and difficult to manipulate. The event forecasting system and methods described herein are expected to overcome these and other deficiencies in existing systems in part by providing automatic filtering of time series data to remove aberrations and automatic selecting of prediction model(s) that are more accurate for the particular time series data set at issue. By providing automated filtering and model selection, using unique techniques not found in existing systems nor that are analogs to human processes for these functions, the event forecasting system improves accuracy and efficiency in predictions from time series data. Further, the event forecasting system can provide a unique user interface that presents both the existing time series data and the predictions, which can be divided into separate visualizations for model predictions, user injected modifications of the model predictions, locked predictions, and/or unlocked predictions, with visual indicators distinguishing between these. With this unique user interface, the event forecasting system facilitates more accurate interpretation of model predictions and greater ease of user manipulations of these model predictions.

Several implementations are discussed below in more detail in reference to the figures. FIG. 1 is a block diagram illustrating an overview of devices on which some implementations of the disclosed technology can operate. The devices can comprise hardware components of a device 100 that can filter time series data to eliminate aberrant instances, dynamically select and update sets of predictive models for the time series data, and effectively present the time series data and predictions with controls to facilitate manual adjustments. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, event forecasting system 164, and other application programs 166. Memory 150 can also include data memory 170, e.g., time series data items, validation values, prediction models, prediction results, UIs, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
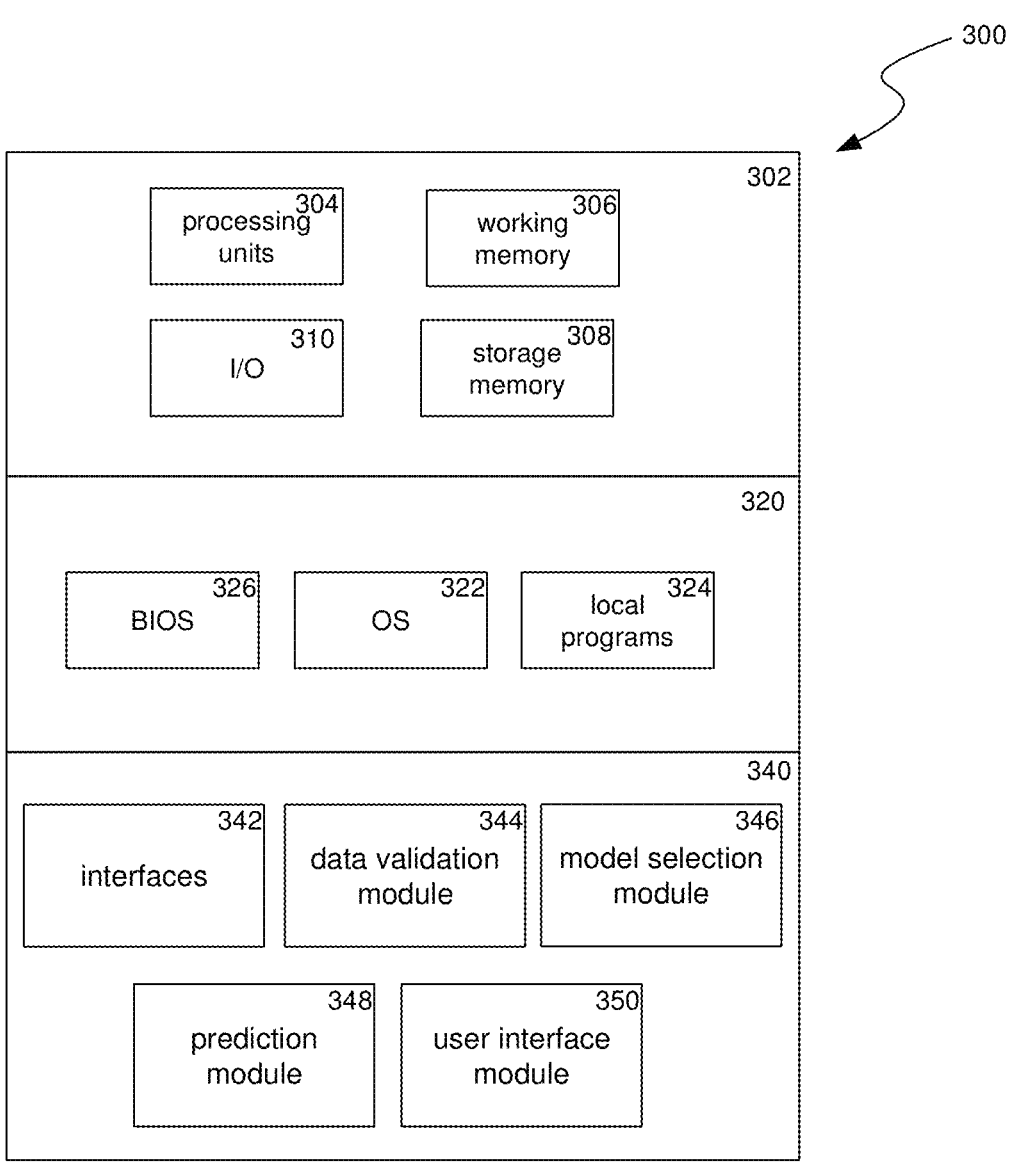
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include data validation module 344, model selection module 346, prediction module 348, user interface module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Data validation module 344 can receive a set of time series data via interfaces 342 and can identify individual ones as aberrations. Data validation module 344 can accomplish this by determining if any of the data items are outside a standard deviation of the entire set of time series data items, by identifying data items that are outside a standard deviation of data items corresponding to previous corresponding measures for that time slot, and/or by identifying data items that have been associated with an external irregular factor (e.g., falling on a holiday or happening during a disaster). Additional details on validating a set of time series data are provided below in relation to FIG. 5 and block 408 of FIG. 4.

Model selection module 346 can identify which of a set of predictive models is likely to produce the best predictions for a given set of time series data. Model selection module 346 can accomplish this by splitting a data set obtained via interfaces 342 (which may have been validated by data validation module 344) into three sections. The first section is used for initial predictions by the set of models; the second section is used to rank the set of models according to the accuracy of the initial predictions. A second round of predictions is then performed with the top ranked models, using the first and second data set sections, where the third section is used as a comparison factor for judging overall model predictive accuracy. Additional details on selecting top performing models for a time series data set are provided below in relation to FIG. 6 and block 410 of FIG. 4.

Prediction module 348 can use the top scoring model(s) from Model selection module 346 to make predictions based on a time series data set obtained via interfaces 342 (which may have been validated by data validation module 344). Additional details on applying one or more top scoring models to make predictions are provided below in relation to block 412 of FIG. 4.

User interface module 350 can generate a user interface with elements such as graphical displays with various portions for types of time series data, predictions, and user modifications and controls for uses to make injects to modify predicted data items. Additional details on a user interface to present prediction data and facilitate user injects are provided below in relation to FIG. 7 and blocks 416-420 of FIG. 4.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
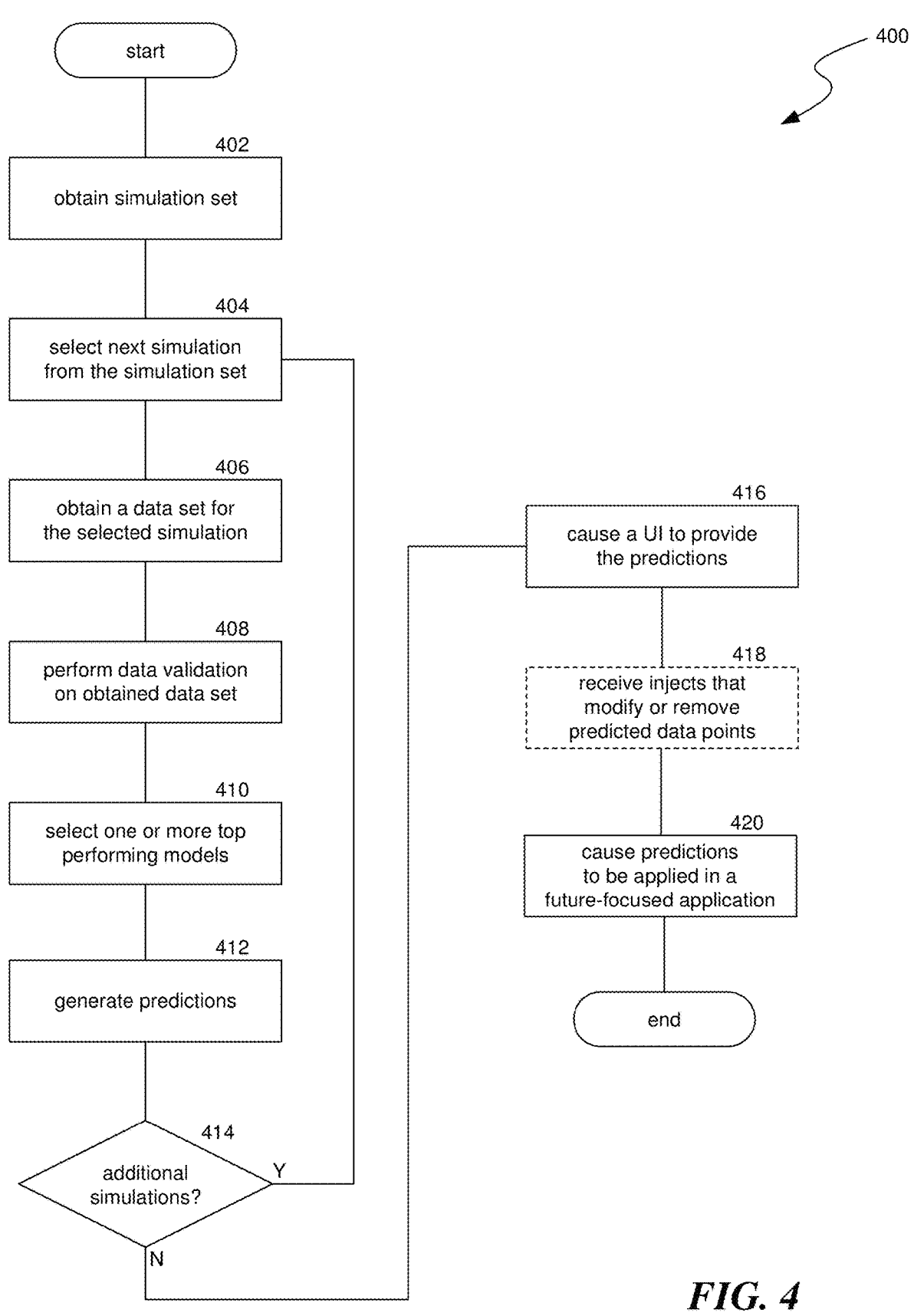
FIG. 4 is a flow diagram illustrating a process used in some implementations for forecasting events by modeling time series data.

FIG. 4 is a flow diagram illustrating a process 400 used in some implementations for forecasting events by modeling time series data. In various implementations, process 400 can be performed on a client system, a server system, or portions of process 400 can each be performed on a client system or a server system. In some implementations, process 400 can be performed in response to a user command or can be triggered by an automated scheduling process—e.g., multiple times per minute, every minute, hourly, daily, weekly, monthly etc.

At block 402, process 400 can obtain a set of simulations defined for the time series modeling. In some implementations, the set of simulations can be defined in a directed acyclic graph (DAG) where each node defines a simulation. Such a DAG can be user-created, e.g., by an organization administrator for the various time series predictions needed by that organization. In other implementations, the set of simulations be a can be a list or other data structure defining an ordered set of simulations. In yet other cases, the set of simulations can include only a single simulation.

At block 404, process 400 can select next simulation from the set. When this is the first time process 400 has reached block 404 in the loop between blocks 404 to 414, process 400 can select a first simulation. In subsequent iterations of this loop, process 400 can select a next simulation as ordered in the obtained simulation set. Where the set of simulations is a DAG, process 400 can start at an indicated first node and move to each subsequent node when all incoming edges for that node are complete. In some cases, a simulation can be complete with it has successfully executed or failed. Where the set of simulations is another ordered set, process 400 can select the next simulation in the order. Where the set of simulations is a single simulation, there may be no loop and only the single simulation is selected.

At block 406, process 400 can obtain a data set corresponding to the selected simulation, retrieving a set of time series data points. In some implementations, this can include executing a data acquisition query defined in the selected simulation, which can define a data source and/or a set of data items to acquire. For example, the simulation can define a SQL query to execute to obtain the time series data points. In some cases, process 400 can use a default data source and/or default columns from the data source. In some implementations, process 400 can improve performance and reduce network bandwidth by storing a local version of the obtained data set, and in subsequent executions of process 400, it can obtain the data stored locally and can retrieve from the data source only the data added or updated since the last execution of that simulation. In some cases, one or more of the data points retrieved can be user injects, provided at block 418 in a previous execution of the simulation.

At block 408, process 400 can perform data validation on the obtained data set. In various implementations, process 400 can perform filtering by one or more of: identifying outliers that are outside a standard deviation of the entire set of time series data items, identifying outliers that are outside a standard deviation of data items corresponding to previous corresponding measures for that time slot (e.g., the set of measures from the same month, from the same date in past years, etc.), and/or can identify data items that have been associated with an external irregular factor (e.g., falling on a holiday, happening during a disaster, resulting from uncommon political instability, etc.) In various cases, process 400 can remove such identified data items or can replace them with an average (or time weighted average) of corresponding previous data items for that time slot. Additional details on performing data validation are provided below in relation to FIG. 5.

At block 410, process 400 can select, from a set of available time series models, one or more top performing models. In various implementations, process 400 can select one or more models for a simulation each time that simulation is performed or may record which model(s) were selected for use in one or more future executions of that simulation. For example, process 400 can select the top performing model(s) periodically (e.g., each n-th execution, such as every 5th) and/or only at certain milestones such only on the first execution or where there is a threshold amount of new data items for the simulation. Selecting a top performing one or more models can include splitting the time series data set into three sections. Process 400 can perform a first evaluation of the available models by using the first section as existing data and determining how well predictions made by each model match the second section data items. The models can be ranked according to results of this first evaluation and the top ranked models (the intermediate top scoring models) can be evaluated a second time by using either the first and second or just the second section as existing data and determining how well predictions made by each of the intermediate top scoring models match the third section data items. Process 400 can then rank the intermediate top scoring models according to results of this second evaluation, and one or more overall top ranked models can be selected. Additional details on selecting one or more top performing models are provided below in relation to FIG. 6.

At block 412, process 400 can generate predictions by executing the one or more top performing models selected at block 410 against the obtain a data set. The generated prediction results can be stored in a data store (e.g., database, local memory, etc.)

At block 414, process 400 can determine whether there are additional simulations in the obtained set of simulations which have not been performed in the loop between block 404 and 414. If so, process 400 can return to block 404; otherwise process 400 can continue to block 416.

At block 416, process 400 can cause a user interface (UI) to provide the predictions from one or more executions of block 412. Causing display of the UI can be in response to a user command to access the UI, which a computing system can generate by accessing, through a defined API, the data store in which the generated prediction results were stored at block 412 and generating graphical outputs. In some implementations, the original time series data can all be retrieved, if not included in the data store. In various implementations, the UI outputs can include indications of the predictions such as in a graph, table, or list. For example, a graph of the time series and predicted data points can be displayed in the UI. In some cases, a first portion of the graph showing the existing time series data can have a first characteristic (e.g., line type, color, etc.), a second portion of the graph corresponding to predictions that have been locked (e.g., are non-modifiable due to the corresponding time of the prediction being within a threshold to the current time) can have a second characteristic, a third portion of the graph corresponding to predictions that have been not been locked (e.g., are modifiable) can have a third characteristic, and/or the graph can distinguish between portions that are based on model predictions and those based on injects with a fourth characteristic. Additional examples of prediction UI features are provided below in relation to FIG. 7.

While any block can be removed or rearranged in various implementations, block 418 is shown in dashed lines to indicate there are specific instances where block 418 is skipped. At block 418, process 400 can receive injects that modify or remove predicted data points. In some cases, the UI can include controls allowing a user to modify at least some of the predictions—i.e., making injects. For example, where the predictions are displayed in a table, the user may be able to edit cells of the table that have not been locked. As another example, where the predictions are displayed in a graph, the user may be able to select points on the graph and be provided with a corresponding prediction value the user can edit. In some cases, each inject can be stored in the data store as a replacement for an original prediction or saved as an alternate, with the original predictions also saved. For example, the UI can access an API for the data store to save the injected data values.

At block 420, process 400 can cause the predicted data points to be applied in a future-focused application. In some cases, any injects made by the user can be supplied to the future-focused application instead of the corresponding model predictions, along with the predictions for which no injects were made. Such a future-focused application can be an application that takes action for forecasted events with past time series data, such as engineering systems, workforce planning applications, production schedules, biological cycles, etc. For example, the predictions can provide a call center work scheduling application predicted call center volumes, a traffic reporting system predicted traffic levels, predicted funds available for predicted invoice payments, etc. Process 400 can then end.

Figure 5:
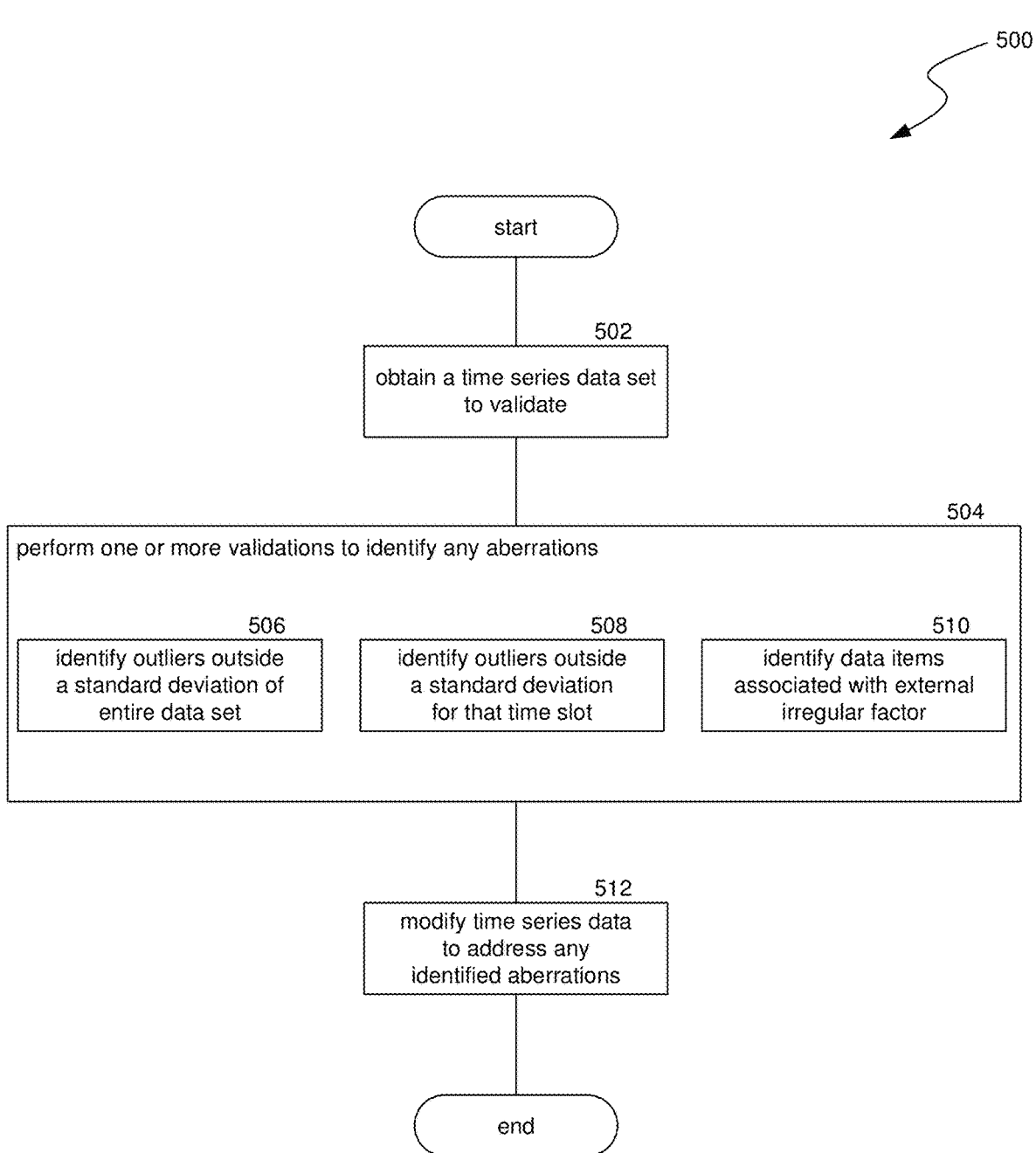
FIG. 5 is a flow diagram illustrating a process used in some implementations for performing data validation on an obtained data set.

FIG. 5 is a flow diagram illustrating a process 500 used in some implementations for performing data validation on an obtained data set. In some cases, process 500 can be performed as a sub-process of process 400, e.g., at block 408.

At block 502, process 500 can obtain a time series data set to validate. This can be the data set obtained at block 402. At block 504, process 500 can perform one or more validations to identify any aberrations. In various implementations, this can include one or more of identifying outliers that are outside a standard deviation of the entire set of time series data items at block 506, identifying outliers that are outside a standard deviation of data items corresponding to previous corresponding measures for that time slot at block 508, and/or identifying data items that have been associated with an external irregular factor at block 510. In various implementations, multiple of block 506-510 may or may not be performed by process 500.

At block 506, process 500 can identify outliers that are outside a standard deviation of the entire set of time series data items. Block 506 can include evaluating the entire set of time series data items to determine the standard deviation (e.g., computing the square root of the data set's variance). Process 500 can then compare each data item in the set of time series data items to see whether it is within the standard deviation from the average of the set of time series data items, and if not identifying it as an aberration. In some cases, a multiple of the standard deviation can be used, such as identifying aberrations where the deviation is 1.5 times the standard deviation.

At block 508, process 500 can identify outliers that are outside a standard deviation of data items corresponding to previous corresponding measures for that time slot. Block 506 can include selecting the time series data items that have a similar timeframe as a given data item, such as falling within the same hour of a day, the same day of a year, the same day of a month, the same week of a year, etc., and computing a standard deviation for that selected portion of the time series data. Block 506 can evaluate each data item in the set of time series data items by comparing that data item to the average of that section of the time series to see whether it is within the standard deviation for that section of the time series, and if not identifying it as an aberration. In some cases, a multiple of the standard deviation can be used, such as identifying aberrations where the deviation is two times the standard deviation.

At block 510, process 500 can identify aberrations when the time for a data item in the time series data items corresponds to an identified external irregular factor. In some cases, a user can specify when external irregular factors occur or can specify types of external irregular factors which process 500 can identify as having occurred by checking sources for those types of occurrences. For example, a user can specify a set of holidays and process 500 can check a calendaring system to determine if a data point corresponds to one of those holidays. In another example, a user can define a threshold change in the stock market as an external irregular factor, and process 500 can check a market watching service to determine whether such a change has occurred. Additional examples of external irregular factors may include the data items having a time coinciding with a disaster, an uncommon political instability, non-standard testing conditions, etc.

At block 512, process 500 can modify the time series data to address any identified aberrations. In some implementations, this can include removing identified aberration data points. In other implementations, this can include replacing the identified aberration data points with an average (or time weighted average) of corresponding previous measures for that time slot. For example, if an aberration data point is identified for Jan. 5, 2021, and the time series data has daily data for 2014-2021, process 500 can replace the Jan. 5, 2021 data value with the average of the January 5th data values of 2014-2020. In another version of this example, process 500 can replace the aberrant Jan. 5, 2021 data value with the average of all the data values from the weeks of January 5th in each of 2014-2020. Process 500 can then end, e.g., returning to block 408 of process 400.

FIG. 6 is a flow diagram illustrating a process 600 used in some implementations for selecting one or more top performing time series models. In some cases, process 600 can be performed as a sub-process of process 400, e.g., at block 410.

At block 602, process 600 can obtain a time series data set and multiple prediction models. In some implementations, the obtained time series data can be the data obtained at block 402, which may have been validated at block 408. The multiple models can include various time series prediction models such as: Autoregression (AR); Moving Average (MA); Autoregressive Moving Average (ARMA); Autoregressive Integrated Moving Average (ARIMA); Seasonal Autoregressive Integrated Moving-Average (SARIMA); Seasonal Autoregressive Integrated Moving-Average with Exogenous Regressors (SARIMAX); Vector Autoregression (VAR); Vector Autoregression Moving-Average (VARMA); Vector Autoregression Moving-Average with Exogenous Regressors (VARMAX); Simple Exponential Smoothing (SES); or Holt Winter's Exponential Smoothing (HWES). At block 604, process 600 can divide time series data set into three sections, such as three equal sections according to time or number or data items in each section.

At block 606, process 600 can apply each prediction model to the first data section to generate first predictions. This can include iterating through each model, where each iteration passes the first data section to the model to forecast future data (e.g., individual points or a curve). In some cases, the same model can be treated as multiple models by process 600 by applying it multiple times with different configurations or parameters.

At block 608, process 600 can identify intermediate top ranked models according to determined accuracies of the first predictions in relation to the second data section. For example, if the predictions from block 606 form a first curve and the second data section forms a second curve, process 600 can determine a difference value (e.g., by computing the cumulative distribution of each curve and then computing the maximum distance between the curves). As another example, a delta can be computed between each data point in the second data section and the corresponding prediction data point, and these deltas can be averaged. There are many other comparison metrics that can be employed to score the difference between each model output and the second data section. The models that produced the output closest to the second data section can be identified as the intermediate top ranked models. This can be a number of the top scoring models (e.g., the top 10 scoring models) or the models with a score above a threshold (e.g., models that scored over 75%).

At block 610, process 600 can apply each intermediate top ranked model, identified at block 608, to at least the second data section to generate second predictions. In some implementations, this can include applying each intermediate top ranked model to both the first and second sections. This applying can be performed in a manner similar to block 606.

At block 612, process 600 can identify one or more overall top ranked models according to determined accuracies of the second predictions in relation to the third data section. This identifying can be performed in a manner similar to block 608, but may use a different number (e.g., only the one or two top scoring models) or threshold (e.g., only models with a score above 90%). Process 600 can then end, e.g., returning to block 410 of process 400.

FIG. 7 is a conceptual diagram illustrating an example 700 of a user interface (UI) providing existing and predicted time series data and an interface for modifying the predicted time series data. The UI in example 700 includes a graph portion 750 and a data items table portion 760.

The graph portion 750 illustrates the UI displaying multiple graph portions 704, 706, 708 and 710. Graph portion 704 corresponds to existing time series data. Graph portion 706 corresponds to predictions that are locked (as modified by any previous injects). Graph portion 708 corresponds to unlocked model predictions prior to any user inject modifications. Graph portion 710 corresponds to unlocked model predictions incorporating any user inject modifications. Locked predictions are those that are within a certain time threshold from the current time or that have been flagged as having been relied upon for another action. These predictions are locked from user inject modifications, as any such modifications would cause changes for which other entities (e.g., a business at large) would not be able to react in time or the resources required for such reactions would be prohibitive. For example, the illustrated UI is for predictions of call center volume for staffing purposes, and once the staffing schedule is set based on the predictions, it would be overly burdensome to change the staffing schedule within two weeks of the current time. In some implementations, there is not a locked section of predictions. Each of the graph portions 704, 706, 708 and 710 can have a different visual characteristic, such as line types, colors, highlighting, etc. In some cases, predictions can have confidence scores (e.g., generated as part of the prediction model output), and when control 702 is enabled, these can be illustrated as a band on either side of the prediction line 710, showing the magnitude of the possible error (i.e., a higher confidence score shows a narrower band around line 710).

The data items table portion 760 illustrates a portion of the UI that shows the time series and predicted data items on which the graph portion 750 is based in a table 712. For the predicted data items that are for a timeframe past the locked section, a user can make injects to directly modify the table values. For example, value 714A has been modified to change an original predicted value of 21,00 to an injected value of 17,350. This change caused creation of adjusted point 714C on line 710 while the original value remains as point 714B on line 708.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative other implementations mutually exclusive of implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for making predictions based on time series data using one or more automatically selected prediction models, the method comprising:

traversing a directed graph that comprises nodes corresponding to simulations;

selecting nodes of the directed graph, wherein the directed graph specifies dependencies between the simulations such that a particular simulation, corresponding to a particular node with one or more incoming edges, is to be selected for performance when one or more previous simulations, corresponding to one or more previous nodes connected to the one or more incoming edges for the particular node, are complete, and wherein, for each selected node, a simulation corresponding to the selected node is performed by:

obtaining a time series data set for the corresponding simulation;

automatically selecting one or more top performing models, from a set of available prediction models, for the time series data set by:

dividing the time series data into three sections;

applying each of the available prediction models to a first of the three sections to generate first predictions for each model;

determining a first accuracy score for each of the available prediction models based on a comparison of the first predictions from each of the available prediction models to values in a second of the three sections;

identifying multiple intermediate top ranked models based on the first accuracy scores;

applying each of the multiple intermediate top ranked models to at least the second of the three sections to generate second predictions for each of the multiple intermediate top ranked models;

determining a second accuracy score for each of the multiple intermediate top ranked models based on a comparison of the second predictions from each of the intermediate top ranked models to values in a third of the three sections of the time series data; and selecting the one or more top performing models based on the second accuracy scores;

generating multiple predictions for the corresponding simulation by applying the selected one or more top performing models to a version of the time series data set;

causing a user interface (UI) to be displayed including a representation of at least some of the multiple predictions generated for the corresponding simulations; and causing the multiple predictions to be applied in a future-focused application.

2. The method of claim 1, wherein a first of the time series data sets for a least one of the corresponding simulations is validated by removing or replacing one or more items in the first time series data set that is identified to be one or more of:

outside a standard deviation of the entire first time series data set;

outside a standard deviation of the data items, from the first time series data set, in a time slot corresponding to that data item;

associated with a user-defined external irregular factor; or a combination thereof.

3. The method of claim 1, wherein the user interface includes at least one graph with sections having different visual characteristics for the time series data sets and the multiple predictions.

4. The method of claim 1, wherein the user interface includes at least one graph with sections having different visual characteristics for A) a first section illustrating some of the multiple predictions that can be modified by user injects and B) a second section illustrating some of the multiple predictions that cannot be modified by user injects.

5. The method of claim 1, wherein the user interface includes at least one graph with sections having different visual characteristics for A) a first portion illustrating some of the multiple predictions and B) a second portion illustrating user injects.

6. The method of claim 1, wherein the identifying the multiple intermediate top ranked models comprises:

selecting the available prediction models with first accuracy scores above a threshold; and/or selecting a defined number of the available prediction models with the highest first accuracy scores.

7. A computer-readable storage medium storing instructions that, when executed by a computing system, cause the computing system to perform a process for making predictions based on time series data using one or more automatically selected prediction models, the process comprising:

traversing a directed graph that comprises nodes corresponding to simulations;

selecting nodes of the directed graph, wherein the directed graph specifies dependencies between the simulations such that a particular simulation, corresponding to a particular node with one or more incoming edges, is to be selected for performance when one or more previous simulations, corresponding to one or more previous nodes connected to the one or more incoming edges for the particular node, are complete, and wherein, for each selected node, a simulation corresponding to the selected node is performed by:

obtaining a time series data set for the corresponding simulation;

automatically selecting one or more top performing models, from a set of available prediction models, for the time series data set by:

dividing the time series data into multiple sections;

applying each of the available prediction models to a first of the multiple sections to generate first predictions for each model;

determining a first accuracy score for each of the available prediction models based on a comparison of the first predictions from each of the available prediction models to the values in a second of the multiple sections; and selecting the one or more top performing models based, at least in part, on the first accuracy scores;

generating multiple predictions for the corresponding simulation by applying the selected one or more top performing models to a version of the time series data set; and causing a user interface (UI) to be displayed including a representation of at least some of the multiple predictions generated for the corresponding simulations.

8. The computer-readable storage medium of claim 7, wherein a first of the time series data sets for a least one of the corresponding simulations is validated by removing or replacing one or more items in the first time series data set that is identified to be one or more of:

outside a standard deviation of the entire first time series data set;

outside a standard deviation of the data items, from the first time series data set, in a time slot corresponding to that data item;

associated with a user-defined external irregular factor; or a combination thereof.

9. The computer-readable storage medium of claim 7, wherein the user interface includes at least one graph with sections having different visual characteristics for the time series data sets and the multiple predictions.

10. The computer-readable storage medium of claim 7, wherein the user interface includes at least one graph with sections having different visual characteristics for A) a first section illustrating some of the multiple predictions that can be modified by user injects and B) a second section illustrating some of the multiple predictions that cannot be modified by user injects.

11. The computer-readable storage medium of claim 7, wherein the user interface includes at least one graph with sections having different visual characteristics for A) a first portion illustrating some of the multiple predictions and B) a second portion illustrating user injects.

12. The computer-readable storage medium of claim 7, wherein the selecting the one or more top performing models comprises:

selecting the available prediction models with first accuracy scores above a threshold; and/or selecting a defined number of the available prediction models with the highest first accuracy scores.

13. A computing system for making predictions based on time series data using one or more automatically selected prediction models, the computing system comprising:

one or more processors; and one or more memories storing instructions that, when executed by the one or more processors, cause the computing system to perform a process comprising:

traversing a directed graph that comprises nodes corresponding to simulations;

selecting nodes of the directed graph, wherein the directed graph specifies dependencies between the simulations such that a particular simulation, corresponding to a particular node with one or more incoming edges, is to be selected for performance when one or more previous simulations, corresponding to one or more previous nodes connected to the one or more incoming edges for the particular node, are complete, and wherein, for each selected node, a simulation corresponding to the selected node is performed by:

obtaining a time series data set for the corresponding simulation;

automatically selecting one or more top performing models, from a set of available prediction models, for the time series data set by:

dividing the time series data into multiple sections;

applying each of the available prediction models to a first of the multiple sections to generate first predictions for each model;

determining a first accuracy score for each of the available prediction models based on a comparison of the first predictions from each of the available prediction models to the values in a second of the multiple sections; and selecting the one or more top performing models based, at least in part, on the first accuracy scores;

generating multiple predictions for the corresponding simulation by applying the selected one or more top performing models to a version of the time series data set; and causing a user interface (UI) to be displayed including a representation of at least some of the multiple predictions generated for the corresponding simulations.

14. The computing system of claim 13, wherein a first of the time series data sets for a least one of the corresponding simulations is validated by removing or replacing one or more items in the first time series data set that is identified to be one or more of:

outside a standard deviation of the entire first time series data set;

outside a standard deviation of the data items, from the first time series data set, in a time slot corresponding to that data item;

associated with a user-defined external irregular factor; or a combination thereof.

15. The computing system of claim 13, wherein the user interface includes at least one graph with sections having different visual characteristics for the time series data sets and the multiple predictions.

16. The computing system of claim 13, wherein the user interface includes at least one graph with sections having different visual characteristics for A) a first portion illustrating some of the multiple predictions and B) a second portion illustrating user injects.

17. The computing system of claim 13, wherein the selecting the one or more top performing models comprises:

selecting the available prediction models with first accuracy scores above a threshold; and/or selecting a defined number of the available prediction models with the highest first accuracy scores.

18. The method of claim 1, wherein a first of the time series data sets for a least one of the corresponding simulations is validated by removing or replacing one or more items in the first time series data set that is identified to be outside a standard deviation of one or more other data items, from the first time series data set, in a same time slot corresponding to the one or more items.

19. The computer-readable storage medium of claim 7, wherein a first of the time series data sets for a least one of the corresponding simulations is validated by removing or replacing one or more items in the first time series data set that is identified to be outside a standard deviation of one or more other data items, from the first time series data set, in a same time slot corresponding to the one or more items.

20. The system of claim 13, wherein a first of the time series data sets for a least one of the corresponding simulations is validated by removing or replacing one or more items in the first time series data set that is identified to be outside a standard deviation of one or more other data items, from the first time series data set, in a same time slot corresponding to the one or more items.

\* \* \* \* \*